US011509412B2

(12) United States Patent
Yu et al.

(10) Patent No.: US 11,509,412 B2
(45) Date of Patent: Nov. 22, 2022

(54) FAST INITIAL ACQUISITION BY TRANSMITTING NON-ORTHOGONAL SYNCHRONIZATION SIGNAL BLOCKS IN 5G NEW RADIO

(71) Applicant: Apple Inc., Cupertino, CA (US)

(72) Inventors: Zhibin Yu, Bayern (DE); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 17/261,706

(22) PCT Filed: Aug. 19, 2019

(86) PCT No.: PCT/US2019/047063
§ 371 (c)(1),
(2) Date: Jan. 20, 2021

(87) PCT Pub. No.: WO2020/041196
PCT Pub. Date: Feb. 27, 2020

(65) Prior Publication Data
US 2021/0297175 A1    Sep. 23, 2021

Related U.S. Application Data

(60) Provisional application No. 62/720,020, filed on Aug. 20, 2018.

(51) Int. Cl.
*H04J 11/00* (2006.01)
*H04L 1/00* (2006.01)
*H04L 5/00* (2006.01)

(52) U.S. Cl.
CPC ....... *H04J 11/0073* (2013.01); *H04J 11/0076* (2013.01); *H04L 1/0061* (2013.01); *H04L 5/0048* (2013.01)

(58) Field of Classification Search
None
See application file for complete search history.

(56) References Cited

U.S. PATENT DOCUMENTS

| 2018/0219664 A1 | 8/2018 | Guo et al. |
| 2018/0227031 A1 | 8/2018 | Guo et al. |

(Continued)

FOREIGN PATENT DOCUMENTS

| KR | 1020180089901 | 8/2018 |
| WO | 2018141981 | 8/2018 |
| WO | 2018142309 | 8/2018 |

OTHER PUBLICATIONS

Written Opinion and International Search Report for International Application No. PCT/US2019/047063, dated Dec. 4, 2019, pp. 1-12.

*Primary Examiner* — Lonnie V Sweet
(74) *Attorney, Agent, or Firm* — Kowert, Hood, Munyon, Rankin & Goetzel, P.C.

(57) ABSTRACT

Systems and methods of initial acquisition in a NR system are described. A UE receives time and frequency superposed SSBs from a gNB. If the PSS and SSS of each SSB is independent of a block index of the SSB, the UE receives an additional reference signal scrambled by a beam index of the SSB and uses the reference signal to discriminate between the SSBs. The reference signal is FDMed within a null-subcarrier region of the SSB or outside of the SSB. If the PSS and SSS of each SSB is scrambled using the block index, the UE separates the PBCH measurements, iteratively identifies a block index associated with a DMRS of the PBCH with the highest L1-RSRP level measurement, decodes and reconstructs the PBCH, and subtracts the reconstructed PBCH from the SSB before transmitting an indication of the PBCH with the highest L1-RSRP level measurement to the gNB.

20 Claims, 5 Drawing Sheets

(56) References Cited

U.S. PATENT DOCUMENTS

2019/0387550 A1* 12/2019 Pan .................... H04W 74/0833
2020/0084798 A1*  3/2020 Peisa ..................... H04W 28/08
2020/0154327 A1*  5/2020 Koskela ................ H04B 7/022
2021/0136823 A1*  5/2021 Kim .................... H04W 74/008

* cited by examiner

FAST INITIAL ACQUISITION BY TRANSMITTING NON-ORTHOGONAL SYNCHRONIZATION SIGNAL BLOCKS IN 5G NEW RADIO

This application claims the benefit of priority to U.S. Provisional Patent Application Ser. No. 62/720,020, filed Aug. 20, 2018, which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to initial acquisition in NR systems.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system, 5G or NR, will provide ubiquitous connectivity and access to information, as well as ability to share data, by various users and applications. NR is expected to be a unified framework that targets to meet starkly different and sometimes, conflicting performance criteria and services. In general, NR will evolve based on 3GPP LTE-Advanced technology with additional enhanced radio access technologies (RATs) to enable seamless wireless connectivity solutions. However, as with the advent of any new technology, many issues arise with the introduction and use of such technology. In this case, the extension of time for initial acquisition due to beamforming in NR systems may be problematic.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
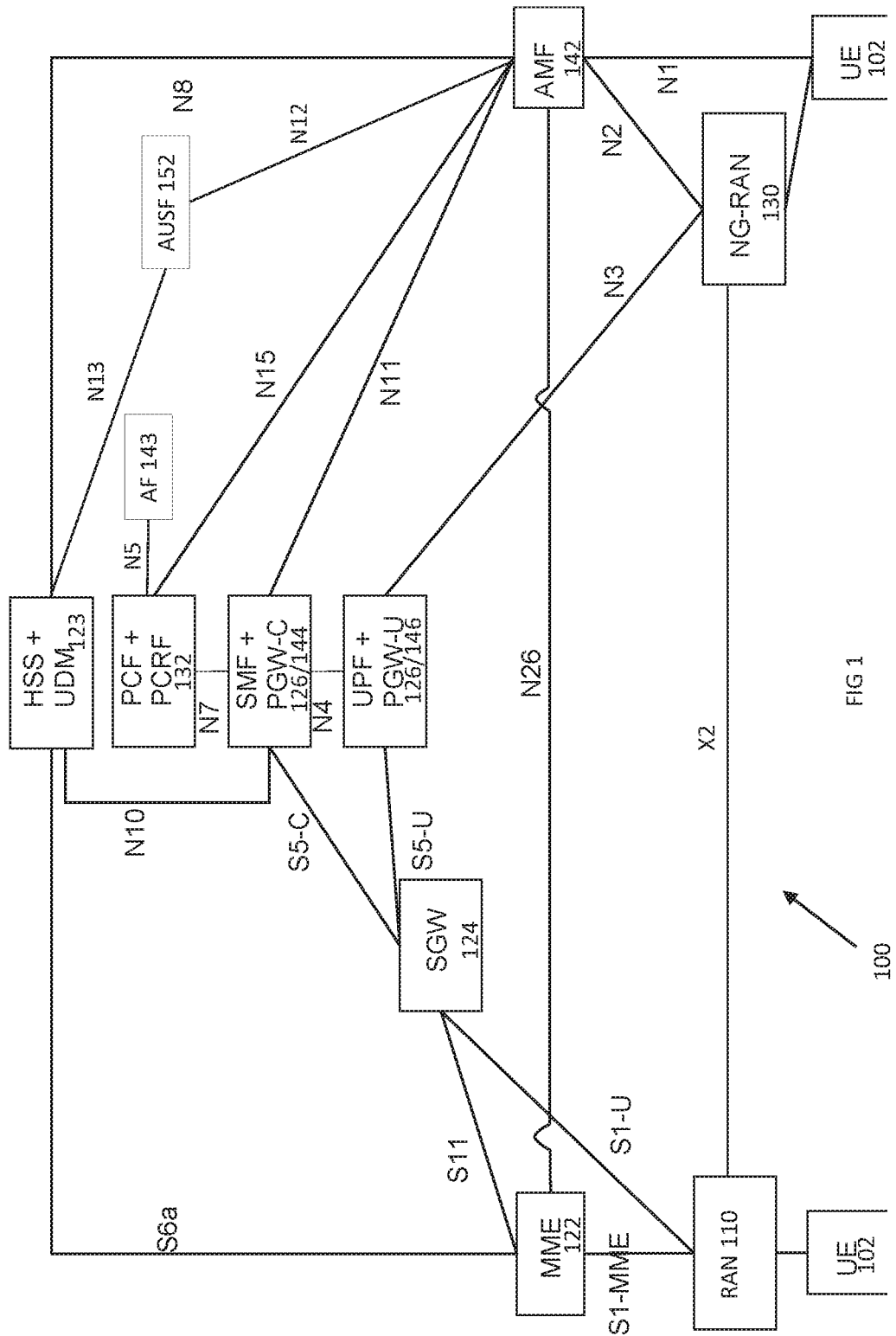
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
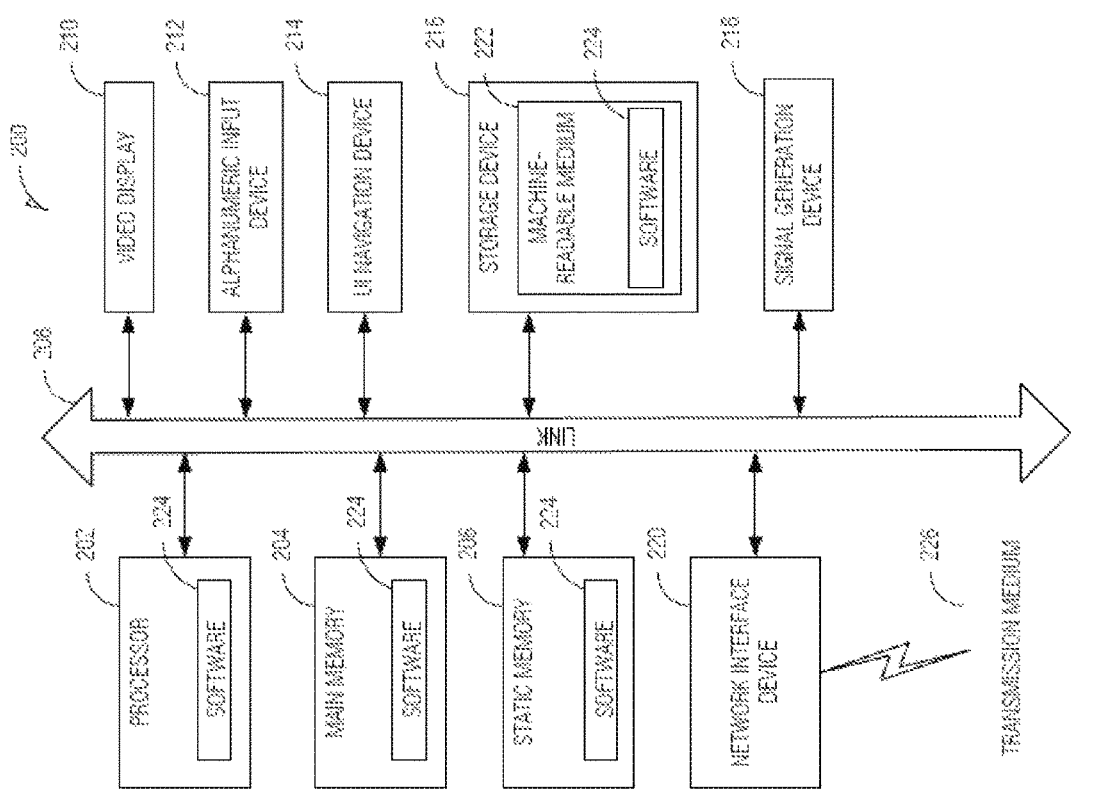
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, the RAN (eNB or gNB) may use beamforming to permit a UE to perform an initial acquisition procedure to connect with the radio access network (cell), as well as for reference signal measurement for mobility purposes—handover either while the UE is in connected or idle mode. Compared with 4G LTE systems, beamforming in NR systems has been significantly enhanced. NR systems introduce additional search dimensions for initial acquisition, which include a transmitter (TX) beam dimension for the sub-6 GHz range (frequency range one (FR1)) and TX beam+receiver (RX) beam dimensions for >6 GHz range (frequency range two (FR2)). Either the initial acquisition or handover procedure in NR systems may involve the detection by the UE of a synchronization signal block (SSB). The SSB contains a primary synchronization signal (PSS), a secondary synchronization signal (SSS), and a physical broadcast channel (PBCH) demodulation reference signal (DMRS) and PBCH payload.

During initial acquisition, the UE may perform an initial synchronization by detecting the PSS and SSS to obtain the cell identity and frame timing. The PSS may provide slot timing and Physical Layer ID; the SSS may provide the physical layer cell identity group number for Radio Frame Timing detection, Physical Layer Cell ID, cyclic prefix length, FDD or TDD determination.

The UE may then obtain the system information during reception of the PBCH in the SSB, which may carry the master information block (MIB) and, in some cases, system information blocks (SIBs) of the cell. The UE may obtain random access procedure configuration information from the PBCH. The PSS and SSS may each be 1 symbol, while the PBCH may be 2 symbols. One or more SSBs may be transmitted in an SSB burst that is itself transmitted within an SS Burst Set that contains one or more SSB bursts of 5 ms. The periodicity of the SS Burst Set may be, for example, 20 ms. The number of possible candidate SSB locations within SS Burst Set may be dependent on the frequency: 4 locations up to 3 GHz, 8 from 3 GHz to 6 GHz, and 64 from 6 GHz to 52.6 GHz.

After obtaining the random access procedure configuration information, the UE may perform a random access procedure. The random access procedure may include the UE initially transmitting a physical random channel (PRACH) (Msg-1) and attempting to receive a random access response (RAR) (Msg-2) in a physical downlink shared channel (PDSCH). The PRACH may carry a random access preamble from the UE towards the RAN. The PRACH may use the random access Radio Network Temporary Identifier (RA-RNTI) and a selected Preamble Index. The PRACH may be sent at the time and frequency location determined from the RACH parameters in SIB2.

The preamble may be generated using Zadoff Chu (ZC) sequences. The preamble, if received by the RAN, may adjust uplink timing for message transmission by the UE, in addition to other parameters. The 5G NR random access preamble supports two different sequence lengths with various format configurations (Format 0, Format 1, Format 2, Format 3, Format A1, Format A2, Format A3, Format B1, Format B2, Format B3, Format B4, Format C0, Format C1). An 839 long preamble sequence is used by four preamble formats (0-3) that are designed for large cell deployment in FR1 range and have a subcarrier spacing of 1.25 KHz or 5 KHz; a 139 short preamble sequence is used by nine preamble formats (A-C) that are designed for small cell deployment/beam sweeping in both the FR1 range with a 15 or 30 KHz subcarrier spacing and mmwave (FR2) range with a 60 or 120 KHz subcarrier spacing. There may be 64 preambles defined in each time-frequency PRACH occasion.

If no RAR is received by the UE inside a predefined (or configured) time window, the UE may retransmit the PRACH with increasing power until the UE receives the RAR. If the UE receives the RAR, the UE may then transmit Msg-3 (RRC Connection Request) using the resources indicated by the RAR and may receive Msg-4 (Contention Resolution, carrying the acknowledgment (ACK)+Contention Resolution ID (CRID)), at which point the initial acquisition procedure ends.

Prior to engaging in the random access procedure however, the UE may attempt to acquire the best TX beam from the gNB (e.g., the TX beam with the highest Received Signal Strength Indicator (RRSI)). To help the UE acquire the best TX beam from the gNB side, the gNB may sweep the TX beams through time-multiplexed SSBs that are, as above, associated with different TX beam-specific SSB indexes within an SSB burst. As above, the TX beam number could be 4, 8, or 64, depending on the frequency range, while the SSB burst may be repeated within a pre-defined periodicity of e.g. 5, 10, 20 or 80 ms.

For the time-multiplexed SSBs within an SSB burst, both the PSS and SSS have the same transmission waveforms among the SSBs. This is because the PSS and SSS are determined by the physical cell ID, which is the same in each transmission. The PBCH DMRS and PBCH payload subcarriers are, however, different transmission waveforms because the PBCH DMRS and PBCH are determined by the SSB block indexes, which are different for different SSBs.

As the gNB sweeps an increasing number of TX beams, the length of an SSB burst is extended to contain more time-multiplexed SSBs. This may consequently extend the initial acquisition time. While the SSBs associated with different TX beams may be frequency-domain multiplexed at the same time using multiple antenna panels that can operate at the same time, the UE may re-adjust the RX central carrier frequency for different SSB frequency locations, which is also time-consuming.

Instead, or in addition, multiple antenna panels or transmission points (TRPs) of the gNB may be used to concurrently steer multiple non-orthogonal SSBs. Each non-orthogonal SSB may be associated with a different TX beam. Each TX beam may have a different TX beam index. The gNB may also superpose the steered SSBs at the same time and frequency allocation—that is the TX beams may completely overlap in time and frequency, if not spatially. Thus, to speed up the TX beam acquisition for NR initial acquisition, the gNB may transmit time-and-frequency overlapped SSB blocks by concurrently transmitting different SSBs from different antenna panels of the same gNB. This may permit the UE to be able to measure multiple TX beams from the gNB at the same time without central frequency re-tuning, resulting in faster initial acquisition even with an increase in the number of gNB TX beams.

Figure 3:
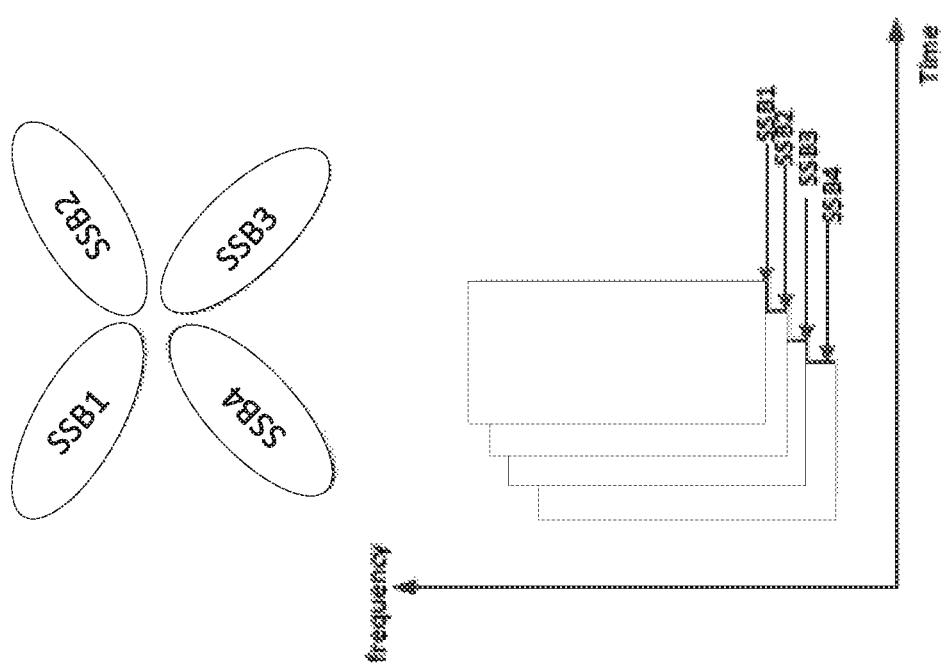
FIG. 3 illustrates an example of a superposition of non-orthogonal system signal blocks (SSBs) in accordance with some embodiments.

In some embodiments, the PSS/SSS within the superposed SSBs may be dependent on the cell ID dependent but independent of the TX beam index. This may result in omnidirectional antenna-like propagation of the PSS/SSS. The use of the same PSS/SSS waveforms irrespective of the beam may also reduce the TX beam search space for PSS/SSS-based cell ID acquisition by the UE. FIG. 3 illustrates an example of a superposition of non-orthogonal system SSBs in accordance with some embodiments. As shown, four TRPs simultaneously provide four SSBs (SSB1, SSB2, SSB3, SSB4) in different directions. Although the SSBs are shown as being symmetric/equally spaced apart (about 90°), in other embodiments, the TRPs may be positioned to provide the SSBs in an asymmetric manner. For example, if UEs are unlikely to be in a particular angular range, coverage of that angular range by the SSBs may be minimized.

In some embodiments, the PBCHs within the superposed SSBs can be scrambled using the same SSB block index. This may result, similar to the PSS/SSS, in omnidirectional antenna-like propagation for the PBCH and also reduce the TX beam search space for PBCH acquisition and slot timing acquisition by the UE.

Figure 4:
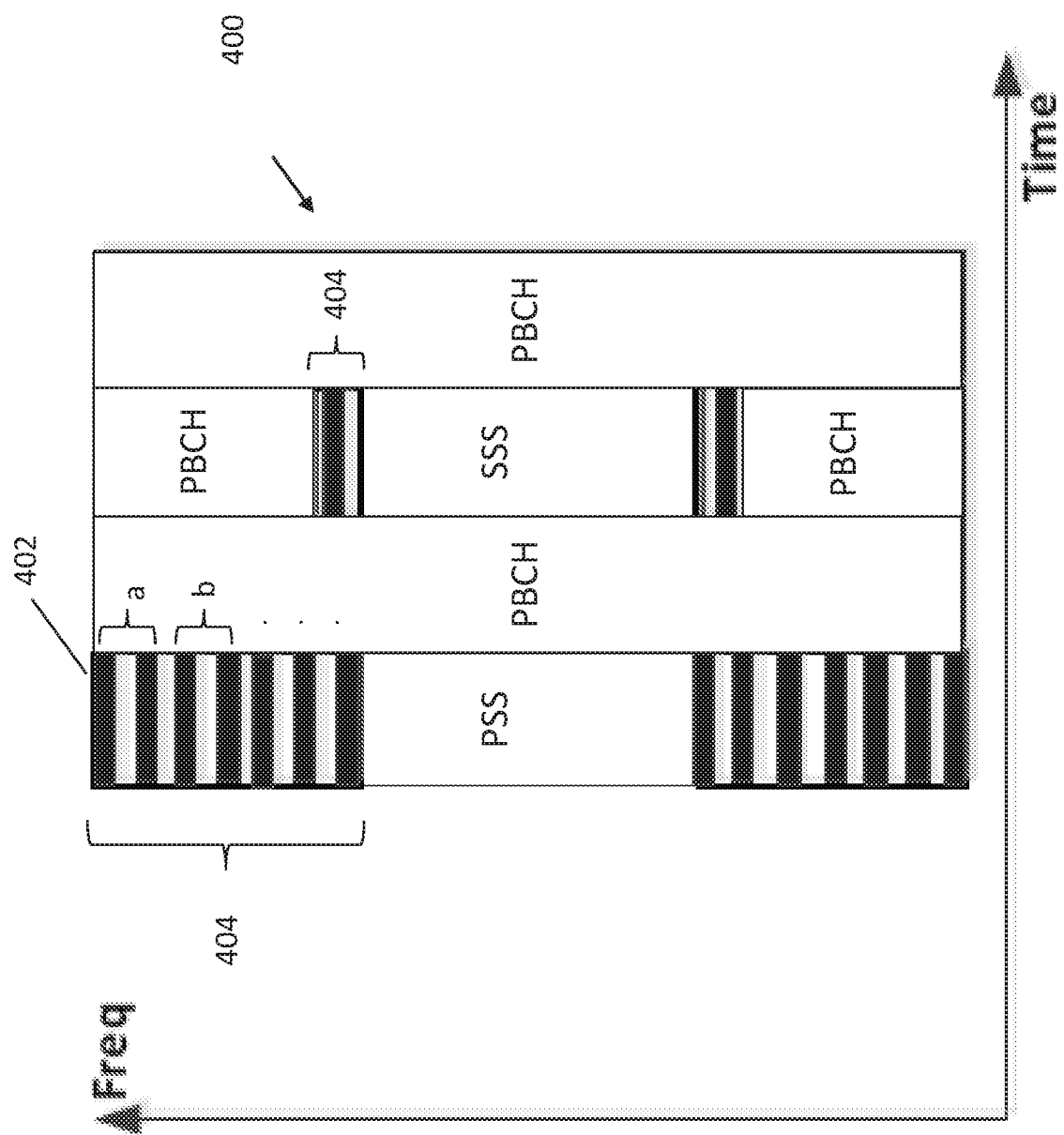
FIG. 4 illustrates an example of an SSB region in accordance with some embodiments.

To discriminate between the SSBs in this case, a tertiary synchronization signal (SS) may be introduced. The tertiary SS may be TX beam dependent and may facilitate the UE separating the measurement for different TX beams. FIG. 4 illustrates an example of an SSB region in accordance with some embodiments. As shown in FIG. 4, the additional beam index-dependent tertiary SS 402 may be disposed within one or more of the SSB null-subcarrier regions 404. As shown, the SSB null-subcarrier regions 404 may be limited to the SSB 400 (not extending outside of the bandwidth of the SSB 400). The null-subcarrier regions 404 do not carry any of the other signals of the SSB 400: the PSS, SSS or PBCH. As shown, the null-subcarrier regions 404 (and thus tertiary SS 402) may be present in one or more of frequencies of the SSB 400 above and below the PSS, as well as at frequencies between the SSS and the surrounding PBCH.

The tertiary SS 402 may be, for example, a channel state information-reference signal (CSI-RS) allocated within the null-subcarrier region 404 within the SSB 400. The beam index-specific tertiary SSs 404 within superposed SSBs 400 can thus be frequency-domain multiplexed (FDMed) to avoid cross-interference among the superposed SSBs 400. Although shown as extending through each of the null-subcarrier regions 404, different portions of one or more of the null-subcarrier regions 404 may carry the beam index-specific tertiary SSs 404. The beam index-specific tertiary SSs 404 may contain different information dependent on the beam index, such as being code division multiplexed, and or may be disposed in different frequency locations of the SSB 400 dependent on the beam index. For example, SSB1 may transmit one or more tertiary SSs 402 in region "a" in frequencies above the PSS in the SSB 400, while SSB2 may transmit one or more tertiary SSs 402 in region "b" in frequencies above the PSS in the SSB 400, etc. The tertiary SSs 402 may be the same in each region or may be different. Alternatively, the tertiary SS 404 can be located in OFDM symbols other than SSBs. For example, the tertiary SS 404 can be located in a regular CSI-RS symbol.

In other embodiments, rather than scramble the PBCHs of the different SSBs using the same SSB block index, the PBCHs within the superposed SSBs can be scrambled by different SSB block indexes. In this case, different PBCH sequences from the superposed SSBs may collide with each other. To address this issue, the UE RX may apply a successive interference cancellation (SIC) algorithm on the colliding PBCHs of the received SSBs, so as to separate the measurement of different TX beams.

Further, considering that the 3GPP release 15-defined SSB block index contains both beam index information and SSB block timing information, the two pieces of two information may be separated by the gNB. After separation, the gNB may use only the beam index to scramble the PBCH sub-carriers, while the same timing information is used for the superposed SSBs. The different SSB block indexes associated with the superposed SSBs can be mapped to the same ODFM symbol index within a downlink (DL) frame.

Moreover, the number of superposed SSBs can be pre-defined in the standard, or run-time indicated from the network to the UE. For example, the number of superposed SSBs may be indicated from LTE sub-carriers in E-UTRA (a/k/a LTE)—NR dual connectivity (EN-DC) mode. This may help the UE to stop the SIC algorithm iterations on the RX side early.

Figure 5:
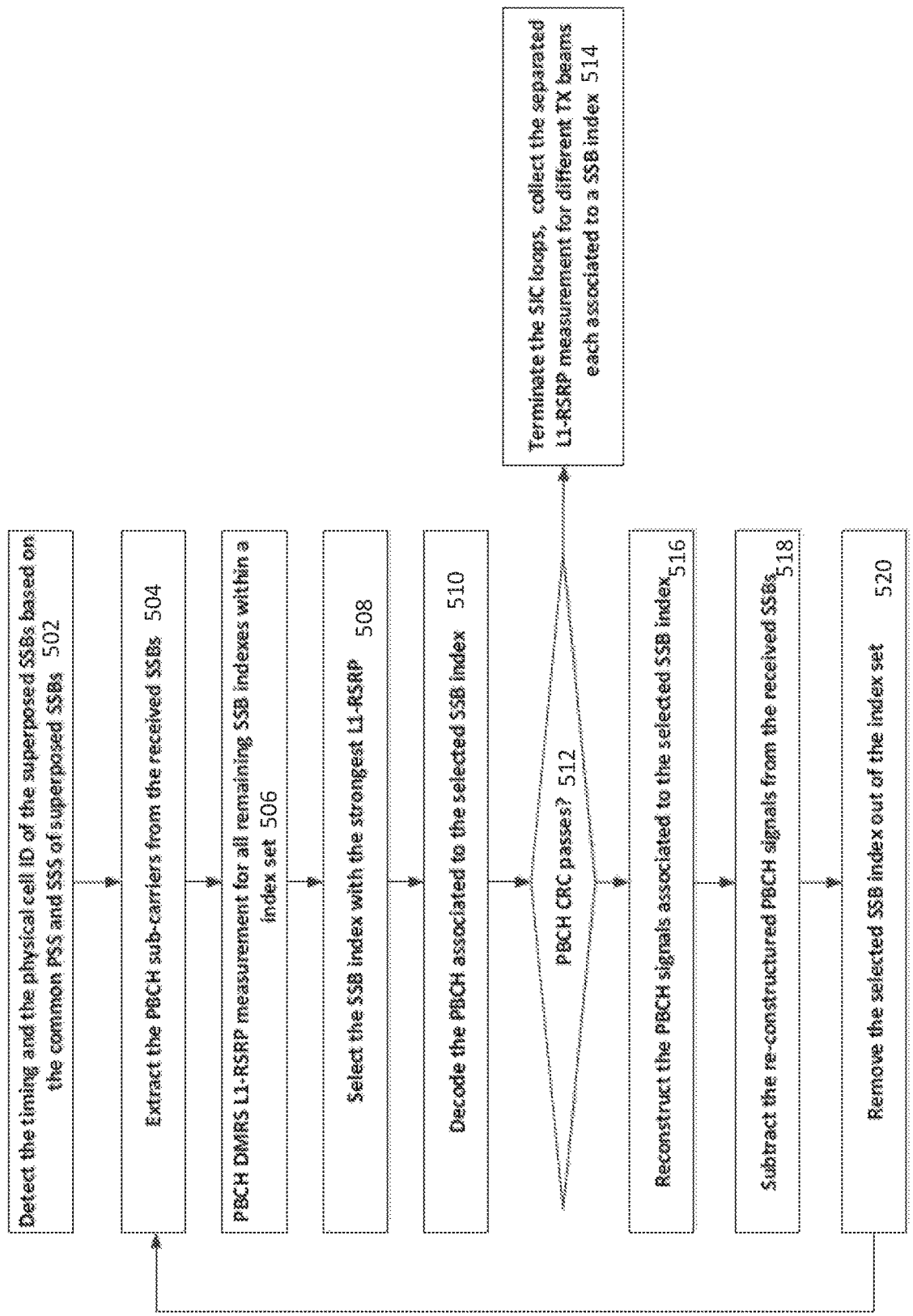
FIG. 5 illustrates an example of a flowchart to separate TX beam measurements in accordance with some embodiments.

FIG. 5 illustrates an example of a flowchart to separate TX beam measurements in accordance with some embodiments. As above, the flowchart is used by the UE when the superposed SSBs are scrambled by different block indexes by the gNB. At operation 502, the UE detects the timing and the physical cell ID of the superposed SSBs based on correlation of the PSS and SSS. There is no PSS/SSS co-interference because all gNB TX beams within a superposed SSB contain the same PSS/SSS signal. As above, the UE may use the PSS and SSS of the superposed SSBs, which are common, to determine the timing and the physical cell ID.

The UE may then separate the distinct PBCH signals (so as to measure the beam quality after separation), in which each distinct PBCH signal is transmitted by a single gNB TX beam within received superposed SSB signal. This separation may be based on SIC algorithm. The remaining operations are directed to an iteration of the separation and determination.

After determining the timing and the physical cell ID, the UE may at operation 504 extract the PBCH sub-carriers from the received SSBs. In some embodiments, the time-domain in-phase and quadrature-phase (IQ) samples of each received superposed SSB are transformed to the frequency domain and the PBCH sub-carriers (SCs) are extracted.

The UE may then, at operation 506, measure the DMRS. In particular, the UE may in some embodiments measure the L1-received signal reference power (RSRP) of the PBCH DMRS for all remaining SSB indexes within an index set.

After obtaining the measurements, the UE may select the SSB index with the strongest L1-RSRP (highest L1-RSRP level) measurement at operation 508 through multiple iterations. The lower L1-RSRPs measurements may not be accurate due to interference, thus, the interest is at the beam index with the strongest L1-RSRP.

The gNB may indicate to the UE the number of superposed SSBs through higher layer signaling, such as a radio resource control (RRC) signal or gNB assistance information. The UE may restrict the maximal number of iterations shown in FIG. 5 based on the number of superposed SSBs indicated by the higher layer signaling. The UE may subsequently at operation 510 decode the PBCH associated with the selected SSB index with the strongest L1-RSRP measurement (also called the highest L1-RSRP level measurement).

At operation 512, the UE may determine whether the PBCH cyclic redundancy check (CRC) passes using the checksum at the end of the PBCH payload. If the CRC does not pass, at operation 514, the UE may determine whether to terminate the SIC iterations. If so, the UE may collect the separated L1-RSRP measurement for the different TX beams, each of which is associated with a different SSB index.

If the CRC passes, the UE may at operation 516 reconstruct the PBCH signals associated with the selected SSB index. The UE may reproduce the strongest PBCH signal, based on re-encoding of the decoded information bits and further re-modulating the re-encoded information bits. This may result in a clean PBCH signal without containing the contributions of other PBCH signals from other TX beams. The UE may then subtract at operation 518 the reconstructed PBCH signals from the received SSBs and remove the selected SSB index from the index set at operation 520 before returning to operation 504. That is, the reproduced clean PBCH signal that forms the strongest TX beam is subtracted from the received IQ samples—hence the strongest interference is removed for the sake of further measuring weaker PBCH signals from other beams. As above, the UE may restrict the number of iterations to the number of superposed SSBs indicated by the higher layer signaling. The use of the SIC algorithm may thus permit each of the TX beams from the gNB to be measured while minimizing co-interference with colliding PBCH signals.

The UE may provide to the gNB an indication of the strongest SSB. For example, during initial acquisition, the UE may send to the gNB a PRACH preamble in a specific uplink resource corresponding to the downlink SSB in which the best signal strength is detected. Alternatively, the UE may send the indication to the gNB in a control channel.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a user equipment (UE), the apparatus comprising:
  one or more processors configured to:
    decode time and frequency superposed synchronization signal blocks (SSBs) from a fifth generation NodeB (gNB), each SSB associated with a different transmission beam from the gNB in a spatial domain, the SSBs each containing a physical broadcast channel (PBCH);
    determine a strongest SSB from measurements of the PBCH of each SSB;
    encode, for transmission to the gNB, an indication of the strongest SSB;
    decode, for each SSB, a primary synchronization signal (PSS) and a secondary synchronization signal (SSS);
    determine, for each SSB, a physical cell identifier (ID) and cell timing from the PSS and the SSS;
    decode, for each SSB, an additional reference signal allocated within a null-subcarrier region of the SSB, wherein the additional reference signal is scrambled by a beam index of the SSB; and
    determine the indication from the additional reference signal.

2. The apparatus of claim 1, wherein:
  the additional reference signal is contained within a plurality of null-subcarrier regions of each SSB.

3. The apparatus of claim 1, wherein:
  the additional reference signal in each SSB is frequency domain multiplexed within the null-subcarrier region.

4. The apparatus of claim 1, wherein:
  the additional reference signal is disposed at a different frequency in each SSB.

5. The apparatus of claim 1, wherein the PSS and the SSS of each SSB are scrambled using a block index of the SSB.

6. The apparatus of claim 5, wherein the one or more processors are further configured to:
  separate the measurements of the PBCHs of the SSBs into measurements of the PBCH of each SSB, and
  repeat through multiple iterations:
    identification of a block index associated with a demodulation reference signal (DMRS) of a PBCH with a highest reference signal received power (L1-RSRP) level measurement, decoding of the PBCH with the highest L1-RSRP level measurement after identification of the PBCH with the highest L1-RSRP level measurement, reconstruction of the PBCH with the highest L1-RSRP level measurement, and subtraction of the reconstructed PBCH from the SSBs.

7. The apparatus of claim 6, wherein the one or more processors are further configured to:

terminate the iterations early when a cyclic redundancy check (CRC) of a decoded PBCH does not pass.

8. The apparatus of claim 6, wherein the one or more processors are further configured to:

determine a number of superposed SSBs through higher layer signaling from the gNB.

9. The apparatus of claim 8, wherein the one or more processors are further configured to:

restrict a maximal number of iterations to the number of superposed SSBs based on the higher layer signaling.

10. The apparatus of claim 5, wherein:

the SSB block indexes associated with the SSBs are mapped to a same orthogonal frequency-division multiplexing (ODFM) symbol index and slot index within a downlink frame.

11. The apparatus of claim 1, wherein the PSS and the SSS of each SSB are scrambled using a same physical cell ID and independent of a block index of the SSB.

12. An apparatus of a base station, the apparatus comprising:

one or more processors configured to:

encode time and frequency superposed synchronization signal blocks (SSBs), each SSB associated with a different transmission beam in a spatial domain, the SSBs each containing a physical broadcast channel (PBCH);

encode, for transmission to a user equipment (UE), a number of the superposed SSBs through higher layer signaling;

decode, from the UE, an indication of a strongest SSB received by the UE;

encode, for each SSB, a primary synchronization signal (PSS) and a secondary synchronization signal (SSS);

encode, for each SSB, an additional reference signal allocated outside of the SSB, wherein the additional reference signal is scrambled by the beam index of the SSB, and the indication is dependent on the additional reference signal.

13. The apparatus of claim 12, wherein the PSS and the SSS of each SSB are scrambled using a block index of the SSB.

14. The apparatus of claim 12, wherein the PSS and the SSS of each SSB are scrambled using a same physical cell identifier (ID) and are independent of a block index of the SSB.

15. A non-transitory computer-readable storage medium that stores instructions for execution by one or more processors of a user equipment (UE), the one or more processors to configure the UE to, when the instructions are executed:

receive time and frequency superposed synchronization signal blocks (SSBs) from a fifth generation NodeB (gNB), each SSB associated with a different transmission beam from the gNB in a spatial domain, the SSBs each containing a primary synchronization signal (PSS) a secondary synchronization signal (SSS), and a physical broadcast channel (PBCH);

when the PSS and the SSS of each SSB are independent of a block index of the SSB, receive an additional reference signal scrambled by a beam index of the SSB, use the additional reference signal to discriminate between the SSBs, and determine a strongest SSB from measurements of the PBCH of each SSB; and transmit to the gNB an indication of the strongest SSB.

16. The medium of claim 15, wherein;

the additional reference signal is allocated within a null-subcarrier region of the SSB.

17. The medium of claim 16, wherein:

the additional reference signal is contained within a plurality of null-subcarrier regions of each SSB.

18. The medium of claim 16, wherein the additional reference signal in each SSB is frequency domain multiplexed within the null-subcarrier region.

19. The medium of claim 16, wherein the additional reference signal is disposed at a different frequency in each SSB.

20. The medium of claim 15, wherein;

the additional reference signal is allocated outside of the SSB.

* * * * *